July 18, 1967
L. BAGNULO
3,331,621
RIGID PIPE CONNECTION
Filed March 9, 1964
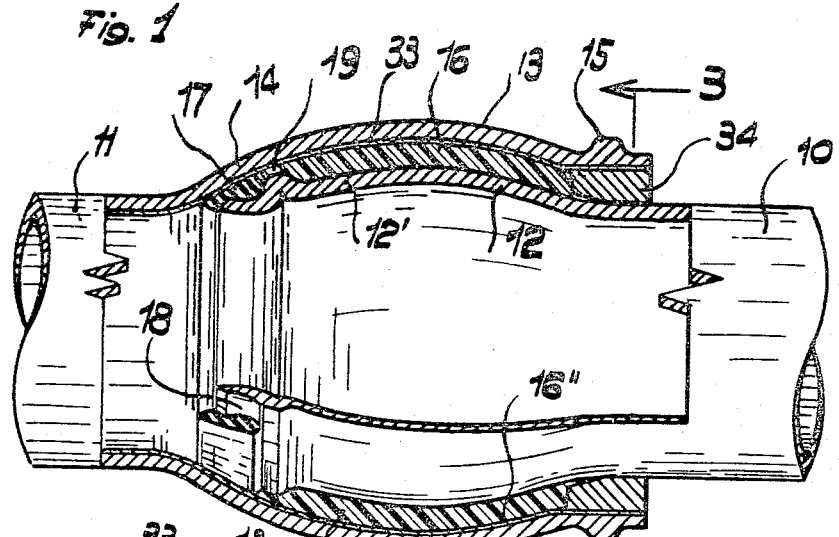
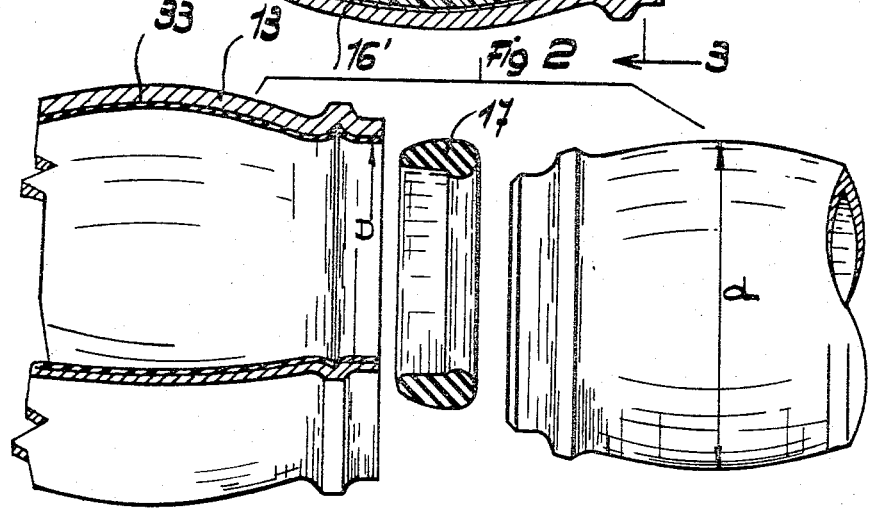
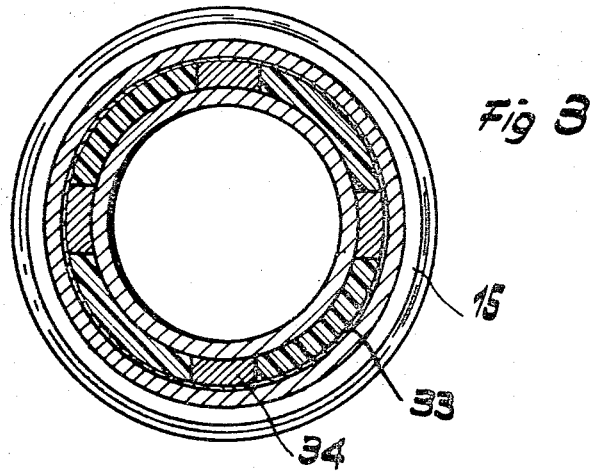
INVENTOR
Luigio Bagnulo
BY
Michael J. Striker
ATTORNEY 3,331,621
RIGID PIPE CONNECTION
Luigi Bagnulo, Milan, Italy, assignor to
Prochind S.p.A., Milan, Italy
Filed Mar. 9, 1964, Ser. No. 350,348
Claims priority, application Italy, Mar. 25, 1958,
586,293
4 Claims. (Cl. 285—47)

The present application is a continuation-in-part application of pending application Ser. No. 800,792, filed Mar. 20, 1959, and entitled "Pipe Connection and Method for Producing Same," now abandoned.

The present invention relates to a pipe joint and a method of making a pipe joint. More particularly, the invention relates to coupling or connecting hollow bodies, such as conduits, tubes or pipes, adapted to conduct liquids or gasses under pressure or not under pressure. The pipes, conduits or tubes may be coupled by the pipe joint of the present invention in head to head or end to end relation or to elbows, T pieces, cross pieces, and the like.

Generally speaking, the present invention relates to a new and improved coupling of the male and female type and a method of making such coupling. The coupling, or joint, includes a male element connected to and, in most cases, made integral with, one of the lengths of pipe to be connected and forming one end portion thereof, and a cup shaped female portion, generally also made integral with a length of pipe and forming the other end portion thereof. The inner diameter of the female portion has a greater magnitude than the outer diameter of the male portion so that the two portions may be fitted together, one within the other, and form an annular interval therebetween. A filling material, generally a tar impregnated cord or other fibrous material or lead wire or strip, may be deeply fit and pressed in the annular interval, for mechanical and fluid-tight connection of the portions and therefore of the relative lengths of hollow bodies.

It is known to those skilled in the art to which this invention appertains that such type of pipe joints require the most careful operation for proper fitting of the parts together and in particular for proper setting of the filling material. The two interconnected elements should be linked by the strict adherence of the filling material with the inner and outer surfaces of the female and male portions, and under axially applied stresses or inner pressure the two elements show a tendency to shear or file off each from the other.

It has been proposed that the connection be constructed by utilizing elements the female portion of which is so shaped as to substantially converge in its open end, so that the filling material pressed in the annular interval is caused to become shaped as an annular mass having an outer nearly frustoconical surface and an inner cylindrical surface. Such an improvement of currently produced couplings of the type described cannot, however, overcome the serious objections of the possible shearing or filing off of the male portion from filling material within the female portion.

In addition, conventional female and male connections of the type having frustoconical end portions are not at all monolithic and require careful assembly when the pipes are laid in a trench; many stresses must be avoided in order not to compromise their tightness and generally cannot bear high pressures.

It is the principal object of the present invention to provide a new and improved pipe joint and method of making a pipe joint. The pipe joint and method of making a pipe joint of the present invention eliminate the aforementioned objections, may be readily effected and resist most severe stresses and abuse. A filling material, not previously subject to pressure, is provided between the male and female portions. Due to the particular joint shape it is not necessary that one of the filling materials hereinafter described be utilized and be filled and pressed in the annular interval. It is sufficient to utilize a filling material which may be poured in liquid or plastic condition into the interval or space between the male and female portions and which, when hardened, constitutes a monolithic piece with the female and male end portions. A suitable filling material may comprise low or quick-setting cement, polymerizable resins, thermosetting or thermoplastic materials or compounds which are liquid at high temperature and harden when cooled. To these materials are added proper filler agents, such as quartz, fiberglass and so on, in order to reduce as much as possible shrinkage during the hardening process.

An annular pressure-tight gasket is provided in the aforescribed pipe joint or coupling. The gasket is of resilient material, such as natural or synthetic rubber, rubber or resilient plastics and the like, positioned between the edge of the male portion and the annular bottom of the female portion, that is, the part of the tube, pipe or conduit including the cup shaped female portion.

In accordance with the present invention, the pipe joint comprises a female pipe end portion of predetermined material, such portion being cup shaped and having a first curved part diverging from an inner narrower end toward an intermediate wider area and a second curved part converging from the intermediate area toward an outer narrower end and a shoulder at the inner narrower end of the first curved part. A male end portion of predetermined material has a first curved part diverging from an inner narrower end toward an intermediate wider area and a second curved part converging from the intermediate area toward an outer narrower end and a shoulder at the outer narrower end of the second curved part of the male portion.

The male pipe end portion is positioned in the female pipe end portion with the converging and diverging parts or surfaces spaced from and confronting each other in double curving relationship and defining a first substantially annular gap and with the shoulders spaced from and confronting each other and defining a second substantially annular gap. A hardenable filling material, generally electrically insulating and generally having a high adhesion characteristic to the material of the female and male pipe end portion is filled in the first gap abutting the converging and diverging surfaces. A resilient springy annular member is positioned in the second gap between and abutting against the shoulders of the female and male pipe end portions and abutting against the filling material in resiliently deformed condition.

If the joint must be electrically insulated, such insulation may be achieved by providing filling material of electrically insulating type and by lining, with a coating of an electrically insulating material, the inner surface of the female portion, or the outer surface of the male portion, or either surface of the male portion or both surfaces of the male portion, or both the inner surface of the female portion and the outer surface of the male portion. The lining may be lengthened for a determined part of the corresponding pipes. The lining is not absolutely necessary, when the filling material is electrically insulating material.

If the joint need not be electrically insulated, the filling material may be of a type which is not electrically insulating and the internal lining need not be provided.

In accordance with the present invention, in assembling the pipe joint or coupling, the resilient annular element is preset to a substantially great axial pressure. This is accomplished by the method of making a joint of the present invention which comprises the steps of placing the male pipe end portion within the female pipe end portion with the converging and diverging surfaces spaced from and confronting each other in double curving relationship and defining a first substantially annular gap and with the shoulders spaced from and confronting each other and defining a second substantially annular gap; placing a resilient springy annular member in the second gap between and abutting against the shoulders of the female and male pipe end portions; moving the female and male pipe end portions longitudinally toward each other so that the male pipe end portion penetrates deeper into the female pipe end portion and resiliently stresses the resilient annular member; holding the female and male pipe end portions in positions in which the resilient annular member is resiliently stressed; filling the first gap with a hardenable filling material, generally, electrically insulating and having a high adhesion characteristic to the material of the female and male pipe end portions; permitting the filling material to set and harden while holding the female and male pipe end portions in their positions; and releasing the female and male pipe end portions while the resilient annular member remains permanently deformed.

After the hardening, the whole pipe joint constitutes a monolithic ensemble, perfectly sealed, even under the highest pressures. In fact, due to the double curving of both female and male end portions whatever the actual stress of the joint is, be it compression, tension or bending, a part of the filling material always bears a compression strain and, therefore, it is in the best condition to strongly resist and to resist the tendency to shearing, slipping or filing off of the parts. In addition, due to the monolithicity of the ensemble, the stresses are transmitted from one part to the other of the pipe by means of the metallic portions and the resin filling, so the permanently deformed resilient annular member does not bear other stresses, has no further variation of volume and is therefore always in the best condition to ensure the perfect seal against the internal fluid under any pressure.

For such characteristics the pipe joint or coupling connection of the present invention has the very important feature that it may be assembled outside a trench and that the pipeline may be handled as one with welded connections.

Another important feature of the pipe joint or coupling connection of the present invention is that it refers to a joint with the desired electric insulation.

In cast iron pipe couplings of known type, in which the coupling utilizes lead, there is some electrical resistance although such resistance is low. Thus, the stray or electrolytic currents flowing along the pipeline are lowered due to the electrical resistances and therefore corrosion caused by such currents is little. Steel pipelines with welded pipe couplings improve considerably over cast iron pipe couplings since they reduce the assembly time and provide greater assurance against leakage. The welded pipe couplings, however, have very little or negligible electrical resistance in length and thus the stray currents flowing along the pipes produce corrosion and necessitate cathodic protection of the pipeline.

On the contrary, the pipe joint or coupling connection of the present invention may be electrically insulating, have as strong a mechanical resistance as the welded connections and in addition overcome the drawbacks of those welded connections which have little or no electrical resistance in length. In fact, the pipe joint of the present invention divides the pipeline into short lengths electrically insulated from each other and thereby avoids the flow of electricity, which is the cause of the corrosion, along the pipe.

In order that the present invention may be readily carried into effect, it will now be described with reference to the accompanying drawing, wherein:

FIG. 1 is a view, partly in side elevation and partly in section, of an embodiment of the pipe joint or coupling of the present invention;

FIG. 2 is an exploded view of the components of the embodiment of FIG. 1, except the filling material thereof, and wherein the components are shown partly in section and prevailingly in side elevation; and FIG. 3 is a cross-sectional view of the pipe joint of FIG. 1, taken along the line 3—3 of FIG. 1.

In the figures the same components are indicated by the same reference numerals.

In the embodiment of FIGS. 1 to 3, the pipe joint or coupling of the present invention is utilized to couple a metallic pipe, conduit or tube 10 having a male end portion 12, 12' with a similar pipe, conduit or tube 11 having a female portion 13, 14. The pipes 10 and 11 may be made of any suitable metal or material such as, for example, brazed or preferably solid drawn steel.

As illustrated, the female pipe end portion 13, 14 is integral with the pipe length 11 and is connected to the remaining part of said pipe through the first curved part 14, which diverges from an inner narrower end toward an intermediate wider area to form the substantially annular bottom of the diverging cup shaped first part of the female portion. The contiguous second part of the female pipe end portion 13, 14 is a second curved part converging from the intermediate area toward an outer narrower end. The outer, or open, end of the female pipe end portion 13, 14 may be reinforced, for example, by a rib 15 in any suitable form.

As may be clearly seen in FIGS. 1 and 2, the male portion 12, 12' is also in curved shape and has a first curved part 12 diverging from an inner narrower end toward an intermediate wider area and a second curved part 12' converging from the intermediate area toward an outer narrower end. The curving of the male and female portions is a function of the length of the male and female portions and of the radial spacing therebetween, and is limited by the condition that the major outer diameter $d$ of the male portion must be made slightly less in magnitude than the magnitude of the minor inner diameter $D$ of the female portion.

Since both male and female portions have corresponding or double curving, under any stresses, such as bonding, compression or tension, a considerable portion of the filling material therebetween bears a compression stress.

The filling material fills the annular space defined by the inner surface of the female portion 13, 14 and the outer surface of the male portion 12, 12' and it is therefore caused to assume the shape of curved mass which becomes subject in a considerable portion to compression as any tendency to shearing, slipping or filing off occurs in the coupled parts, as is readily understood by a consideration of FIG. 1.

The filling material 16 comprises a hardenable resin which, when hardened, has a high mechanical and generally also electrical resistance. The filling material 16 is a material which has a generally characteristic of great adhesion to the metal of the pipes 10 and 11 to insure complete nonolithicity or unity of the joint or coupling of the invention.

The filling material comprises, when hardened, two adjacent oppositely converging parts or forms 16' and 16", adapted to be subject to compression as a tendency to shearing, slipping or filing off, and as a tendency to further penetration of the component pipes, occurs, for best ensuring the pressure tightness of the connection.

The joint or coupling of the invention is further provided with an annular element 17 of rubber or rubber-like material located in abutting relationship between the end or edge part of the second part 12' of the male portion 12, 12' and the first part 14 of the female portion, 13, 14. In particular, the edge part of male portion 12, 12' may be provided with a shoulder forming seat 18 adapted to abut the annular element 17, which is forcedly pressed against the inner surface 19 of the first part 14 of the female portion 13, 14.

The rubber annular element or gasket 17 closes the joint to the fluid in the pipes joined and is the only portion of the joint in contact with such fluid.

In the case that electrical insulation is required in the pipe coupling, the inner or inside surfaces of the female portions of the pipe may be provided with an insulating coating. A coating 33 of electrically insulating material, for example, plastic material, lacquer or the like, may preferably be applied to the inside or inner surface of the female portion 13, 14 and to at least a part of the inside surface of the pipe 11. Of course, the outside or inside of the male portion 12, 12' may be provided with a coating of electrically insulating material.

In addition, the filling material 16 may be an electrically insulating resin, in which case the aforementioned linings are not absolutely necessary.

Inversely, if an electrical connection is required between the coupled components of the pipeline, to insure, for example, the grounding of the line, a number of metallic wedges comprising metallic blocks 34 may be forced at evenly spaced intervals between the edge of the second part of the female portion 13, 14 and the first part 12 of the male portion 12, 12', at the location wherein such male portion is of minor diameter. Such wedges may be further utilized advantageously for provisional assembling of pipelines; the annular gasket forming element 17 being capable, in most cases, of ensuring the fluid-tight connection of the elements.

In the method of making a joint of the present invention, the male portion 12, 12' is pressed with great pressure into the female portion 13, 14 after the annular element 17 is positioned in said female portion. The annular element 17 is thus compressed or deformed to a considerable extent. The pipe components may be linked in their high pressure relative positions by means of suitable clamping or bracket devices (not shown), of the type currently used in installing known male and female connections, until the filling material 16 is poured and has set between the male and female portions.

Upon setting or hardening of the filling material, the annular element 17 is held fast in its compressed condition and does not bear any other deformation caused by the possible stresses to which the pipe and then the joint, may be subjected. This is due to the fact that the joint becomes a monolithic piece, where the stresses are transmitted from the pipe 10 to the pipe 11 by means of the metallic portions and the resin filler. Thus, the annular element 17 does not vary further in volume, forms a block with the filling material 16 and the male and female portions and is always in the best condition to ensure perfect sealing against the internal fluid under any pressure.

Although the invention has been described and shown in only a few forms of embodiment thereof, it is intended that the invention not be limited to the details shown, and that said details not be taken as restrictive of the invention, as it is obvious that various modifications in design may occur to those skilled in the art to which this invention appertains without departing from the spirit and scope of the invention, as defined in and by the appended claims.

Without further analysis, the foregoing will so fully reveal the gist of this invention that others can by applying current knowledge readily adapt it for various applications without omitting features that, from the standpoint of prior art, fairly constitute characteristics of the generic or specific aspects of this invention and, therefore, such adaptations should and are intended to be comprehended within the meaning and range of equivalence of the following claims.

Having thus described the invention, what is claimed as new and desired to be protected by Letters Patent is:

1. A rigid pipe joint comprising, in combination, a barrel-shaped female pipe end portion having an inner surface concavely curved as seen in the direction of elongation of said female pipe end portion to thereby provide the same with constricted inner and outer ends; a barrel-shaped male pipe end portion having an outer surface convexly curved as seen in direction of elongation of said male pipe end portion complementarily to the concave curvature of said inner surface and having an inner end provided with a shoulder, said barrel-shaped male pipe end portion being positioned in said barrel-shaped female pipe end portion with said concavely and convexly curved surfaces spaced from and confronting each other in double curving relationship and defining a first substantially annular barrel-shaped gap with said shoulder spaced from and confronting the constricted inner end of said female pipe end portion and defining therewith a second substantially annular gap; a resilient annular member positioned in compressed condition in said second gap between and abutting against the shoulder of said male pipe end portion and said inner surface of said female pipe end portion at said constricted inner end thereof; and means for preventing any displacement of said male and female pipe end portions with reference to one another including a hard barrel-shaped filler filling said first gap which prevents transmission of stresses from said pipe end portions to said annular member.

2. A rigid pipe joint comprising, in combination, a barrel-shaped female pipe end portion having an inner surface concavely curved as seen in the direction of elongation of said female pipe end portion to thereby provide the same with constricted inner and outer ends; a barrel-shaped male pipe end portion having an outer surface convexly curved as seen in direction of elongation of said male pipe end portion complementarily to the concave curvature of said inner surface and having an inner end provided with a shoulder, said barrel-shaped male pipe end portion being positioned in said barrel-shaped female pipe end portion with said concavely and convexly curved surfaces spaced from and confronting each other in double curving relationship and defining a first substantially annular barrel-shaped gap with said shoulder spaced from and confronting the constricted inner end of said female pipe end portion and defining therewith a second substantially annular gap; a resilient springy annular member positioned in compressed condition in said second gap between and abutting against the shoulder of said male pipe end portion and said inner surface of said female pipe end portion at said constricted inner end thereof; and means for preventing any displacement of said male and female pipe end portions with reference to one another including a hard barrel-shaped filler filling said first gap and adhering to said male and female pipe end portions which prevents transmission of stresses from said pipe end portions to said annular member.

3. A rigid pipe joint comprising, in combination, a barrel-shaped female pipe end portion having an inner surface concavely curved as seen in the direction of elongation of said female pipe end portion to thereby provide the same with constricted inner and outer ends; a barrel-shaped male pipe end portion having an outer surface convexly curved as seen in direction of elongation of said male pipe end portion complementarily to the concave curvature of said inner surface and having an inner end provided with a shoulder, said barrel-shaped male pipe end portion being positioned in said barrel-shaped female pipe end portion with said concavely and convexly curved surfaces spaced from and confronting each other in double curving relationship and defining a first substantially annular barrel-shaped gap with said shoulder spaced from and confronting the constricted inner end of said female pipe end portion and defining therewith a second substantially annular gap; a resilient springy annular member positioned in compressed condition in said second gap between and abutting against the shoulder of said male pipe end portion and said inner surface of said female pipe end portion at said constricted inner end thereof; and means for preventing any displacement of said male and female pipe end portions with reference to one another including a hard barrel-shaped filler of electrically insulating material filling said first gap and adhering to said male and female pipe end portions which prevents transmission of stresses from said pipe end portions to said annular member.

4. A rigid pipe joint comprising, in combination, a barrel-shaped female pipe end portion having an inner surface concavely curved as seen in the direction of elongation of said female pipe end portion to thereby provide the same with constricted inner and outer ends; a barrel-shaped male pipe end portion having an outer surface convexly curved as seen in direction of elongation of said male pipe end portion complementarily to the concave curvature of said inner surface and having an inner end provided with a shoulder, said barrel-shaped male pipe end portion being positioned in said barrel-shaped female pipe end portion with said concavely and convexly curved surfaces spaced from and confronting each other in double curving relationship and defining a first substantially annular barrel-shaped gap with said shoulder spaced from and confronting the constricted inner end of said female pipe end portion and defining therewith a second substantially annular gap; a resilient springy annular member positioned in compressed condition in said second gap between and abutting against the shoulder of said male pipe end portion and said inner surface of said female pipe end portion at said constricted inner end thereof; and means for preventing any displacement of said male and female pipe end portions with reference to one another including a hard barrel-shaped filler of electrically insulating material filling said first gap and adhering to said male and female pipe end portions which prevents transmission of stresses from said pipe end portions to said annular member; and electrically insulating material lining the inner surface of said female pipe end portion for a part of said female pipe end portion in the area of said male pipe end portion.

References Cited

UNITED STATES PATENTS

| | | | |
|---|---|---|---|
| 29,281 | 7/1860 | Isbell | 285—297 |
| 248,469 | 10/1881 | Isbell | 285—295 |
| 283,972 | 8/1883 | Converse | 285—331 X |
| 747,061 | 12/1903 | Gilbert | 285—295 |
| 1,046,085 | 12/1912 | Kraus | 285—54 |
| 1,334,530 | 3/1920 | Flint | 285—296 |
| 1,640,058 | 8/1927 | Stringer | 285—295 X |
| 1,960,249 | 5/1934 | Mano | 285—296 X |
| 2,067,768 | 1/1937 | Krefft | 285—382.5 X |
| 2,108,848 | 2/1938 | Engel et al. | 285—231 |
| 2,118,893 | 5/1938 | Meerbeck | 156—294 |
| 2,272,194 | 2/1942 | Frances | 285—295 |
| 2,348,589 | 5/1944 | Auten | 85—82 |
| 2,424,878 | 7/1947 | Crook | 156—294 |
| 2,589,876 | 3/1952 | Sesher | 285—295 |
| 2,764,427 | 9/1956 | Andrus | 285—55 X |
| 2,940,787 | 6/1960 | Goodner | 285—47 X |
| 2,991,092 | 7/1961 | Mackay | 285—231 X |

FOREIGN PATENTS

| | | |
|---|---|---|
| 84,551 | 6/1921 | Austria. |
| 407,691 | 1/1910 | France. |
| 883,048 | 3/1943 | France. |
| 1,294 | 5/1877 | Germany. |
| 643,721 | 4/1937 | Germany. |
| 5,617 | 3/1901 | Great Britain. |

CARL W. TOMLIN, *Primary Examiner.*

D. W. AROLA, *Assistant Examiner.*